Oct. 14, 1952 E. VROOM 2,614,168

SIGNAL TRANSMITTER

Filed July 8, 1950 3 Sheets-Sheet 1

INVENTOR
E. VROOM
BY
R. O. Covell
ATTORNEY

Oct. 14, 1952 E. VROOM 2,614,168

SIGNAL TRANSMITTER

Filed July 8, 1950 3 Sheets-Sheet 2

INVENTOR
E. VROOM
BY R. O. Covell
ATTORNEY

INVENTOR
E. VROOM
BY R.O. Covell
ATTORNEY

Patented Oct. 14, 1952

2,614,168

UNITED STATES PATENT OFFICE 2,614,168

SIGNAL TRANSMITTER

Edward Vroom, Ossining, N. Y., assignor to Bell Telephone Laboratories, Incorporated, New York, N. Y., a corporation of New York Application July 8, 1950, Serial No. 172,737

12 Claims. (Cl. 177—380)

This invention relates to a signaling system and more particularly to a system for scanning and transmitting stored information.

An object of this invention is the accurate and rapid transmission of signals.

Another object of this invention is the rapid scanning of a series of digit registers to ascertain the data stored in those registers and to transmit electrical indications representative thereof.

This invention is a system operative successively to scan a plurality of registers or a plurality of groups of registers and to transmit as representations of the information contained therein a plurality of electrical pulses on a time division basis.

In general, the system utilizes cold cathode gaseous discharge devices each having a plurality of cathodes. The tubes are arranged to operate in response to pulses applied thereto to advance the conductive path therein step by step from cathode to cathode. Certain of the cathodes of a first one of said devices are associated with each of a plurality of registers. Another such device is arranged successively to associate the registers with an output means, thereby causing the first one of said devices successively to scan the several registers or several groups of registers.

The principles of the invention may be more fully understood from the following detailed description of preferred embodiments thereof when read with reference to the accompanying drawings in which.

The multicathode stepping tubes which are employed in the present system may be of any suitable type. A tube operable in a suitable manner is disclosed, for example, in United States Patent 2,575,370 granted November 20, 1951 to W. A. Townsend, the disclosure of which is incorporated herein by reference. Two figures from the drawings contained in that application are presented as Figs. 1 and 2 of the present disclosure.

In general, the disclosed gaseous discharge device comprises an anode and a plurality of cold cathodes in cooperative relationship with the anode, the cathodes being mounted in a row which may be rectilinear, circular or of any other geometrical form. The cathodes, or certain of them, are electrically grouped and are so constructed and arranged that the discharge between one cathode and the anode may be stepped or shifted selectively to a path between the anode and another cathode in response to signal pulses, the discharge shifting or advancing one position for each pulse.

Figure 1:
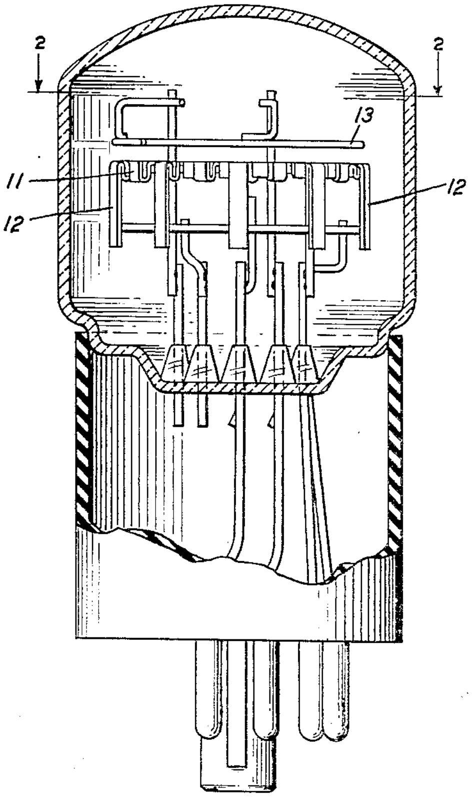
Fig. 1 is an elevational view of a multicathode glow discharge device illustrative of one type of tube suitable for use in the present system.
Figure 2:
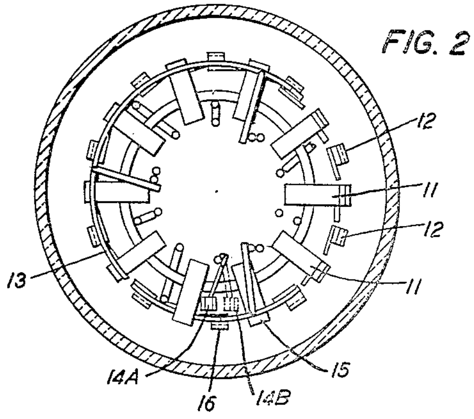
Fig. 2 is a sectional view taken along 2—2 of Fig. 1 illustrating the arrangement of the several cathodes and the cooperative relation thereof with the anode, a portion of the anode being broken away to show certain of the cathodes more clearly.

Referring now to Figs. 1 and 2 of the drawings, the tube of the exemplary type comprises a plurality of cathodes 11, hereinafter referred to as "A" cathodes, and a second plurality of cathodes 12, hereinafter designated "B" cathodes, all of the cathodes being mounted in a circular array with each A cathode 11 interposed two B cathodes 12. The main anode 13 may be ring shaped and is supported in spaced relation with the A and B cathodes. An auxiliary, start, reset, or normalizing electrode 14A or 14B may also be provided.

In one method of operating the stepping tube, a suitable positive potential is supplied to the main anode 13 and a potential negative with respect to the main anode potential is applied to the auxiliary electrode 14A which, therefore, serves as a start cathode. A discharge will occur between these two electrodes. If a negative pulse then be applied to the B cathodes 12, the discharge will transfer initially so as to exist between the main anode and the first one of the B cathodes. This first B cathode is labeled 16 in Fig. 2. At the cessation of the pulse, the discharge will transfer so as to exist between the main anode and the first one of the A cathodes in a counter-clockwise direction in the structure as shown in Fig. 2. This first A cathode is labeled 15 in the structure as shown in Fig. 2 and it is supplied with a suitable voltage through an impedance. In a similar manner, successive pulses applied to the B cathodes 12 will cause the conductive path in the tube to transfer so as to exist between the main anode 13 and the successive A cathodes 11. The directivity of the stepping is accomplished by the construction of the cathodes, in a manner fully set forth in the above-cited patent application or in any other suitable manner.

As the conductive path progresses step by step from position to position in the tube, the conduction is limited to one path at a time, i. e., the conduction between the main anode and the previous A cathode 11 is extinguished. This may be accomplished by utilizing a suitable impedance in series with the main anode of the device whereby the increased voltage drop across this impedance, resulting from the transfer of conduction to a B cathode 12, is sufficient to cause the voltage between the main anode 13 and the A cathode 11 to fall below the sustaining value.

The multicathode gaseous discharge device may be utilized in an alternative manner if desired. The aforesaid start electrode may be employed as a start anode, cooperating with a start cathode. This modification may be accomplished in a number of ways, one of which is shown in Fig. 2 of the drawings. In view of the directional nature of the tube, the start electrode 14 should be moved from its position as indicated at 14A to the position indicated in dashed lines at 14B. The first A cathode 15 is connected as a start cathode under this modification, as will be demonstrated hereinafter. In this use of the tube, a suitable positive potential is applied to the main anode 13, a potential negative relative to the main anode potential is applied to the start cathode 15, and a pulse positive with respect to the start cathode potential is applied to the start anode 14B. A discharge initially occurs between the start anode 14B and the start cathode 15, with conduction then transferring so as to exist between the main anode 13 and the start cathode 15. The stepping thereafter proceeds in a counterclockwise direction, in the structure as shown in Fig. 2, in the manner above described.

Figure 3:
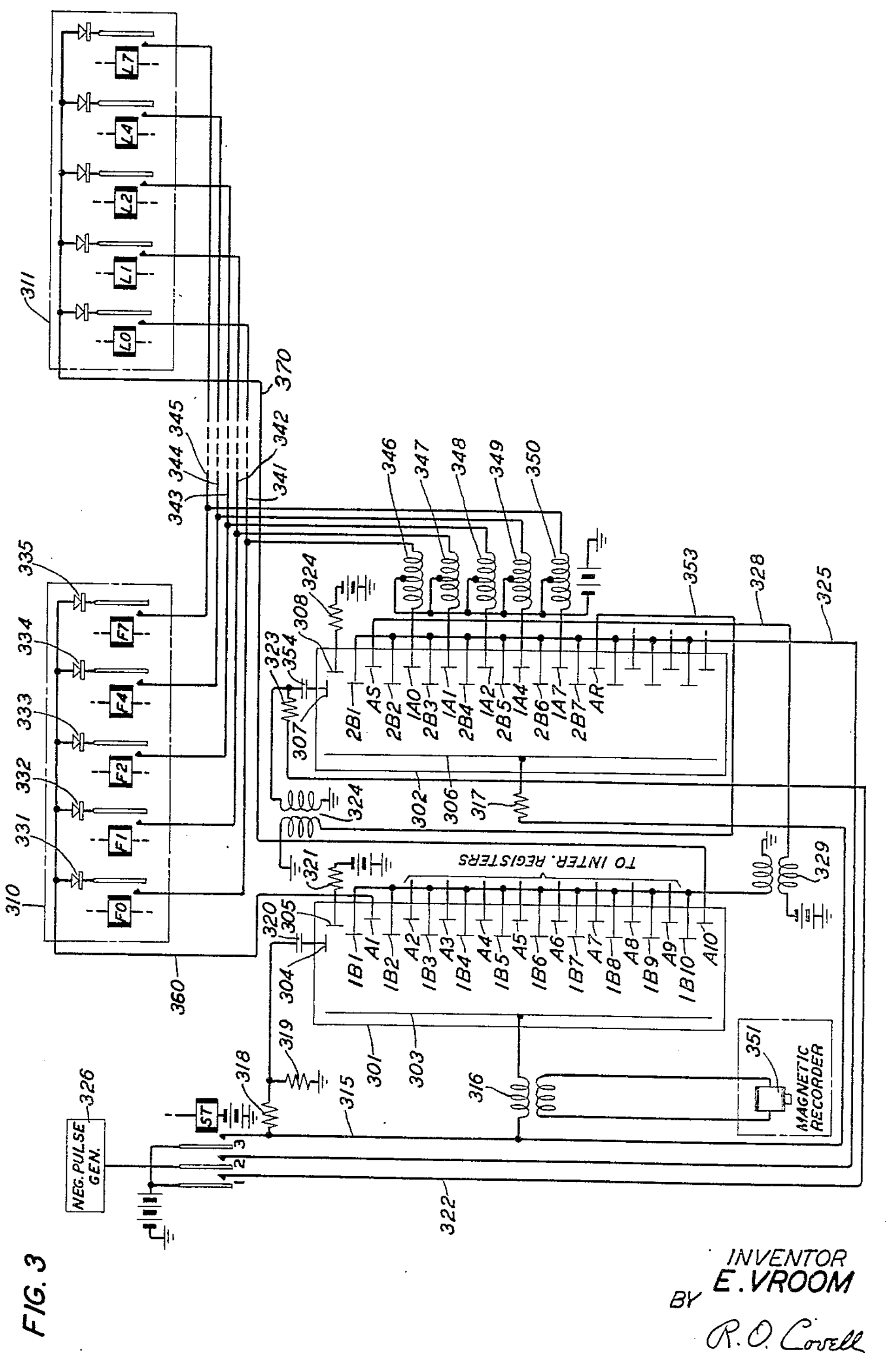
Fig. 3 is a circuit diagram representing one form of the invention.

A circuit embodying the principles of the invention is shown in Fig. 3 of the drawings. In this circuit, two multicathode stepping tubes 301 and 302 are provided. These tubes may be of the type shown in Figs. 1 and 2 modified as hereinbefore discussed to provide both a start anode and a start cathode. Thus, if that tube structure be employed, in tube 301, anode 303 is shown in Fig. 2 as anode 13, the B cathodes 1B1 to 1B10 are shown as the cathodes 12 in Fig. 2, the A cathodes A1 to A10 are shown as the cathodes 11 in Fig. 2, the start anode 304 is shown as electrode 14B in Fig. 2, and the start cathode 305 is shown as electrode 15 in Fig. 2. Similarly, tube 302 is provided with an anode 306, B cathodes 2B1 to 2B7, A cathodes AS, 1A0, 1A1, 1A2, 1A4, 1A7 and AR, start anode 307 and start cathode 308.

Tubes 301 and 302 cooperate to perform a successive scanning of a plurality of digit registers. These registers may be of any known type. For example, a first digit register 310 and a last digit register 311 are shown in Fig. 3, each comprising five relays F0, F1, F2, F4 and F7 and L0, L1, L2, L4 and L7, respectively, operable on a two-out-of-five code basis to register any digit. In the embodiment of the invention shown in Fig. 3, the relays in each of the registers, when operated, associated selected ones of the A cathodes of tube 302 with an A cathode in tube 301, which is individual to that digit register, in a manner hereinafter to be described.

At any time after a series of digits, representing for example a telephonic designation, has been recorded in the digit registers 310 and 311, relay ST may be operated in any suitable manner, normally under the control of other circuits not shown. Relay ST, in operating, connects positive battery, which may supply, for example, 130 volts, through its No. 3 contact to conductor 315 whereby a positive potential is supplied through the primary winding of transformer 316 to the anode 303 of tube 301, and also through resistor 317 to the anode 306 of tube 302. The potential on conductor 315 is also connected through resistors 318 and 319 to ground whereby a positive potential is applied through capacitor 320 to the start anode 304 of tube 301.

The start cathode 305 of tube 301 is connected through resistor 321 to negative battery which may supply, for example, 50 volts. A discharge is therefore initiated between the start anode 304 and the start cathode 305. This discharge immediately transfers so as to exist between the main anode 303 and the start cathode 305. The discharge between start anode 304 and start cathode 305 is extinguished as capacitor 320 becomes charged.

In a similar manner, a discharge is initiated in tube 302. Relay ST, in operating, connects positive battery through its No. 1 contact to conductor 322, through resistor 323, and through the impedance comprising the secondary winding of transformer 324 to ground whereby a positive potential is applied through capacitor 354 to the start anode 307 of tube 302. Since the start cathode 308 of tube 302 is connected to a suitable source of negative potential through resistor 324, a discharge will be initiated between electrodes 307 and 308. An immediate transfer will occur whereby the conductive path in tube 302 will exist between the main anode 306 and the start cathode 308.

The B cathodes of stepping tube 302 are connected in multiple to conductor 325, No. 2 contact of operated relay ST, and to negative pulse generator 326. This generator may be of any well-known type arranged continuously to supply negative pulses of suitable amplitude and frequency. For example, the tube structure shown in Figs. 1 and 2 has been found properly to respond to pulses applied at a rate in excess of 8000 pulses per second.

When the low impedance negative pulse generator 326 applies the first pulse to the B cathodes of tube 302 after discharge has been initiated in that tube, the conductive path will be transferred so as to exist between the main anode 306 and the first B cathode 2B1 of tube 302. As a result, due to the increased voltage drop across anode resistor 317, the potential at the main anode 306 of tube 302 will drop to a point where the potential difference between the main anode 306 and the start cathode 308 is below the sustaining value and that discharge path will thereby be extinguished. As the pulse attenuates, the discharge in tube 302 will again transfer so as to exist between the main anode 306 and the A cathode AS. Cathode AS is connected to negative battery by conductor 328 and through the primary winding of transformer 329. Therefore, as a result of the discharge in tube 302 transferring to the A cathode AS thereof, a negative pulse will be applied to the B cathodes of tube 301 from the secondary winding of transformer 329. As a result, in a manner similar to that above described, the conductive path in tube 301 will initially momentarily exist between the main anode 303 and the first B cathode 1B1 of tube 301 and will then transfer so as to exist between the main anode 303 and A cathode A1. Extinction of the previous conductive path in tube 301 occurs in the manner above described.

Cathode A1 of tube 301 is connected by conductor 330 to the armatures of the relays F0 to F7 in the first digit register 310 through individual varistors 331 to 335. These varistors are unidirectional current conducting devices, having relatively low impedance to conventional current flow in the direction of the arrow when the arrow sides thereof are at a potential positive relative to the other sides.

Depending upon which two of the five digit registers relays F0 to F7 are operated, two paths will be closed through the front contacts of the operated relays to two of the conductors 341 to 345 which are connected through the secondary windings of transformers 346 to 350, respectively, to negative battery. This negative battery is also connected through the primary windings of transformers 346 to 350 to the A cathodes 1A0, 1A1, 1A2, 1A4 and 1A7, respectively, in tube 302.

At the next pulse from the negative pulse generator 326, the conductor path in tube 302 is momentarily stepped to B cathode 2B2 and then transfers, as that pulse subsides, to A cathode 1A0. The resulting start of current flow through the primary winding of transformer 346 will cause the secondary winding of transformer 346 to transmit a pulse, here assumed to be negative, via conductor 341, and if relay F0 be operated, this pulse will be applied through the front contact of relay F0, varistor 331, conductor 360 and to cathode A1 of tube 301. As a result, the anode current of tube 301 will momentarily increase whereby a pulse will be induced in the secondary winding of transformer 316. This pulse may be transmitted to any suitable output means. For example, it may be applied to the recording head 351 of a magnetic recorder.

At the next pulse from the generator 326, the conductive path in tube 302 is stepped to cathode 2B3 and then to cathode 1A1, and a pulse appears at the secondary winding of transformer 316 if relay F1 be operated. Similarly, as the conductive path in tube 302 is successively stepped to the A cathode 1A2, 1A4 and 1A7, the output of tube 301 will be effectively modulated if, but only if, relays F2, F4 and F7, respectively, are operated.

It will now be clear that the purpose of the varistors associated with each of the digit register relays is to prevent the negative pulse transmitted from the secondaries of any one of the transformers 346 to 350 from finding a path to negative battery through any of the secondaries of the other transformers 346 to 350. Thus, without the varistors 331 to 335, at least one such path would exist since two of the relays F0 to F7 in the first digit register 310 will be operated. Additionally, since the conductors 341 to 345 are multiplied to the front contacts of the corresponding relays in all of the digit registers, other such paths might exist were varistors not provided individual to the relays of each of the digit registers.

When the conductive path in tube 302 has been stepped to A cathode AR, the current flows from anode 306 to cathode AR, conductor 353, primary winding of transformer 324 and to ground. As a result, a positive pulse will be transmitted from the secondary winding of transformer 324 and through capacitor 354 to the start anode 307 of tube 302. This pulse causes the conductive path in tube 302 immediately to transfer momentarily to exist between the start anode 307 and the start cathode 308, with a transfer immediately occurring whereby conduction exists between the main anode 306 and the start cathode 308. The stepping of tube 302 then continues in a manner hereinbefore set forth except that when the conductive path in tube 302 includes cathode AS, a pulse is transmitted to the B cathodes of tube 301 to cause the conductive path in tube 301 to step so as to exist between anode 303 and A cathode A2. In a manner similar to the association between A cathode A1 and the first digit register 310 as above described, cathode A2 is connected through a series of varistors to the armatures of the relays in the second digit register (not shown) and the front contacts of those relays are connected to conductors 341 to 345, respectively. Similarly, at each recycling of tube 302, tube 301 is stepped to provide a successive association of the several digit registers 310 to 311 with the A cathodes A1 to A10 of tube 301 via conductors 360 to 370.

It will be seen that the apparatus functions successively to scan a plurality of digit registers and to transmit a series of pulses representative of those register digits. In the transmission of each digit, a start pulse, resulting from the inition discharge in tube 301 or from the stepping of the conductive path in tube 301, is transmitted followed by two pulses time spaced from the start pulse in accordance with the digit registered.

Figure 4:
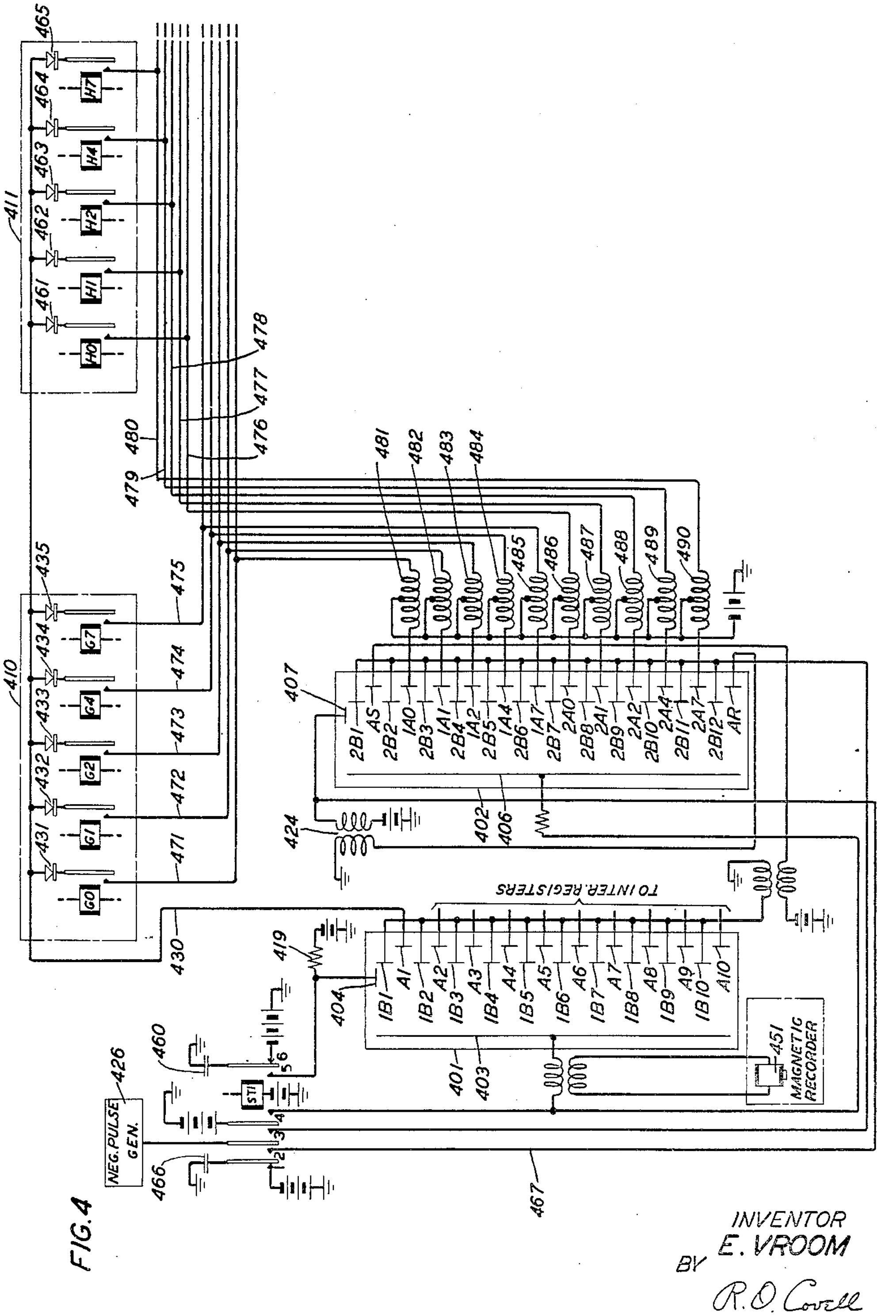
Fig. 4 is a circuit diagram representing another form of the invention.

The circuit represented in Fig. 4 of the drawings is in many aspects operationally identical to the above-described circuit represented in Fig. 3. The major differences are in the arrangement whereby two or more digit registers may be scanned in each cycle of operation of the scanning tube, and in the deletion of one of the start electrodes in each of the stepping tubes.

Tube 401 is provided with an anode 403, B cathodes 1B1 to 1B9, A cathodes A1 to A10 and start electrode 404. Tube 402 is provided with an anode 406, B cathodes 2B1 to 2B12, A cathodes AS, 1A0, 1A1, 1A2, 1A4, 1A7, 2A0, 2A1, 2A2, 2A4, 2A7 and AR, and start electrode 407. With the exception of the start electrodes, the voltages are applied to the several electrodes of tubes 401 and 402 in a manner similar to that of Fig. 3.

The start electrodes of tubes 401 and 402 are employed, in this embodiment of the invention, as start cathodes. The tube structure may be of the type hereinbefore described, in which event electrodes 404 and 407 in tubes 401 and 402, respectively, will be the equivalent of start electrode 14A in Fig. 2. Prior to the operation of relay ST1, capacitor 460 is charged from negative battery and through the No. 6 contact of relay ST1. Upon the operation of relay ST1, capacitor 460 will discharge through the No. 5 contact of relay ST1, resistor 419, and to negative battery whereby a negative pulse will be applied to the start cathode 404 of tube 401. A discharge will thereby be initiated in tube 401 and that conductive path will then continue to exist from the anode 403 to the start cathode 404, resistor 419 and to negative battery. When tube 402 causes a pulse to be applied to the B cathodes of tube 401, in a manner similar to the above-described operation of Fig. 3, the conductive path in tube 401 will initially transfer so as to exist between the anode 403 and the first B cathode 1B1 (B cathode 16 in Fig. 2), and after the pulse subsides, the conductive path will again transfer so as to exist between the anode 403 and A cathode A1. Cathode A1 of tube 401 is connected by a conductor 430 to the armatures of the relays G0 to G7 in the first digit register 410 through individual varistors 431 to 435 and also to the armatures of the relays H0 to H7 in a second digit register 411 through individual varistors 461 to 465.

Depending upon which two of the five digit register relays G0 to G7 are operated, two paths will be closed through the front contacts of the operated ones of those relays to two of the conductors 471 to 475. Conductors 471 to 475 are connected to negative battery through the secondary windings of transformers 481 to 485. Similarly, depending upon which two of the five digit register relays H0 to H7 are operated, two paths will be closed through the front contacts of the operated ones of those relays to two of the conductors 476 to 480. Conductors 476 to 480 are connected to negative battery through the secondary windings of transformers 486 to 490. The primary windings of transformers 481 to 490 are connected between negative battery and the A cathodes 1A0 to 2A7, respectively, of tube 402.

The discharge in tube 402 is initiated in a manner similar to that above described in relation to tube 401. Capacitor 466 which has become charged from negative battery and through the No. 1 contact of relay ST1, is discharged, upon the operation of relay ST1, through the No. 2 contact of relay ST1, conductor 467, secondary winding of transformer 424 and to negative battery whereby a negative pulse is applied to the start cathode 407 of tube 402. A discharge is thereby initiated in tube 402 and that discharge continues from the anode 406, start cathode 407, secondary winding of transformer 424 and to negative battery.

As pulses from the negative pulse generator 426 are applied to the B cathodes of tube 402, the conductive path in tube 402 will be progressively stepped in the manner hereinbefore described and the condition of the two digit registers 410 and 411 will be successively scanned in a single cycle of operation of tube 402. The output of tube 401 will be modulated in accordance with the digits registered in the registers 410 and 411. The recycling of tube 402 and the stepping of tube 401 occurs in a manner similar to that above described in relation to Fig. 3. Upon successive cycles of operation of tube 402 additional pairs of digit registers may be scanned.

It will be seen that the circuits may be arranged to scan a single digit register operating on a two-out-of-five basis, on a decimal basis or on any other basis, or may be arranged to scan more than one digit register in a single cycle of operation.

It is to be understood that the above-described arrangements are but illustrative of the application of the principles of the invention. Numerous other arrangements may be devised by those skilled in the art without departing from the spirit and scope of the invention.

What is claimed is:

1. In a communication system, a pulse source, a gaseous conduction device having a plurality of distinct conduction positions and responsive to pulses transmitted from said pulse source to advance the conductive path therethrough step by step from position to position, output means, a plurality of conductors, means controlled by said device and operative when the conductive path in said device is in a certain one of its conductive positions for successively connecting said output means to successive ones of said conductors, and means selectively connecting said conductors to the conductive path in said device when the said conductive path in said device is in selected ones of its conductive positions.

2. In a communication system, a pulse source, a gaseous conduction device having a plurality of distinct conduction positions and responsive to pulses transmitted from said pulse source to advance the conductive path therethrough step by step from position to position, means including said device for causing said device to recycle, output means, a plurality of conductors, means operative once each cycle of operation of said device for connecting said output means to successive ones of said conductors on successive cycles of operation of said device, and means selectively connecting said conductors to the conductive path in said device when the said conductive path in said device is in selected ones of its conductive positions.

3. In a communication system, a pulse source, a gaseous conduction device having a first electrode and a plurality of other electrodes and responsive to pulses transmitted from said pulse source to advance the conductive path therethrough step by step so that said path exists between said first electrode and successive ones of said other electrodes, output means, a plurality of conductors, means controlled by said device and operative when the conductive path in said device is between said first electrode and a certain one of said other electrodes for successively connecting said output means to successive ones of said conductors, and means selectively connecting said conductors to selected ones of said other electrodes in said device.

4. In a communication system, a pulse source, a gaseous conduction device having a first electrode a second electrode and a plurality of other electrodes and responsive to pulses transmitted from said pulse source to advance the conductive path therethrough step by step so that said path exists between said first electrode and successive ones of said other electrodes, means coupling one of said other electrodes to the said second electrode to cause the device to recycle, output means, a plurality of conductors, means operative once each cycle of operation of said device for connecting said output means to successive ones of said conductors on successive cycles of operation of said device, and means selectively connecting said conductors to selected ones of said other electrodes in said device.

5. In a communication system, a pulse source, a gaseous conduction device having a first electrode, a second electrode and a plurality of other electrodes and responsive to pulses transmitted from said pulse source to advance the conductive path therethrough step by step so that said path exists between said first electrode and successive ones of said other electrodes, means coupling one of said other electrodes to the said second electrode to cause the device to recycle, output means, a plurality of conductors, means controlled by said device and operative each time when the conductive path in said device is between said first electrode and a certain one of said other electrodes for connecting said output means to successive ones of said conductors, and means selectively connecting said conductors on successive cycles of operation of said device to selected ones of said other electrodes in said device.

6. In a communication system, a pulse source, a gaseous conduction device having a first electrode and a plurality of other electrodes and responsive to pulses transmitted from said pulse source to advance the conductive path therethrough step by step so that said path exists between said first electrode and successive ones of said other electrodes, output means, a plurality of conductors, means controlled by said device and operative when the conductive path in said device is between said first electrode and a certain one of said other electrodes for successively connecting said output means to successive ones of said conductors and a plurality of digit registers selectively connecting said conductors to selected ones of said other electrodes in said device in accordance with the digits registered in said digit registers.

7. In a communication system, a pulse source, a first gaseous conduction device having a first electrode, a first plurality of other electrodes, and a second plurality of other electrodes and responsive to pulses transmitted from said pulse source and applied to said first plurality of other electrodes to advance the conductive path therethrough step by step so that said path exists between said first electrode and successive ones of said second plurality of other electrodes, a second gaseous conduction device having a first electrode a first plurality of other electrodes and a second plurality of other electrodes and responsive to pulses transmitted from said first device and applied to said first plurality of other electrodes of said second device to advance the conductive path therethrough step by step so that said path exists between said first electrode and successive ones of said second plurality of other electrodes, output means connected to said first electrode of said second device, a plurality of conductors connected to said second plurality of other electrodes of said second device, and means selectively connecting said conductors to selected ones of said second plurality of other electrodes in said first device.

8. In a communication system, a pulse source, a first gaseous conduction device having a first electrode, a first plurality of other electrodes, and a second plurality of other electrodes and responsive to pulses transmitted from said pulse source and applied to said first plurality of other electrodes to advance the conductive path therethrough step by step so that said path exists between said first electrode and successive ones of said second plurality of other electrodes, a second gaseous conduction device having a first electrode a first plurality of other electrodes and a second plurality of other electrodes and responsive to pulses transmitted from said first device and applied to said first plurality of other electrodes of said second device to advance the conductive path therethrough step by step so that said path exists between said first electrode and successive ones of said second plurality of other electrodes, output means connected to said first electrode of said second device, a plurality of conductors connected to said second plurality of other electrodes of said second device, means selectively connecting said conductors to selected ones of said second plurality of other electrodes in said first device, and means coupling one of said second plurality of other electrodes in said first device to said first plurality of other electrodes of said second device whereby pulses are transmitted from said first device and applied to said second device.

9. In a communicating system, a pulse source, a first gaseous conduction device having a first electrode, a second electrode, a first plurality of other electrodes and a second plurality of other electrodes and responsive to pulses transmitted from said pulse source and applied to said first plurality of other electrodes to advance the conductive path therethrough step by step so that said path exists between said first electrode and successive ones of said second plurality of other electrodes, means coupling one of said second plurality of other electrodes to the said second electrode to cause the device to recycle, a second gaseous conduction device having a first electrode, a first plurality of other electrodes and a second plurality of other electrodes and responsive to pulses transmitted from said first device and applied to said first plurality of other electrodes of said second device to advance the conductive path therethrough step by step so that said path exists between said first electrode and successive ones of said second plurality of other electrodes, output means connected to said first electrode of said second device, a plurality of conductors connected to said second plurality of other electrodes of said second device, means selectively connecting said conductors to selected ones of said second plurality of other electrodes in said first device, and means coupling one of said second plurality of other electrodes in said first device to said first plurality of said other electrodes of said second device whereby pulses are transmitted from said first device and applied to said second device.

10. In a communication system, a pulse source, a first gaseous conduction device having a first electrode, a second electrode, a first plurality of other electrodes and a second plurality of other electrodes and responsive to pulses transmitted from said pulse source and applied to said first plurality of other electrodes to advance the conductive path therethrough step by step so that said path exists between said first electrode and successive ones of said second plurality of other electrodes, means coupling one of said second plurality of other electrodes to the said second electrode to cause the device to recycle, a second gaseous conduction device having a first electrode, a first plurality of other electrodes and a second plurality of other electrodes and responsive to pulses transmitted from said first device and applied to said first plurality of other electrodes of said second device to advance the conductive path therethrough step by step so that said path exists between said first electrode and successive ones of said second plurality of other electrodes, output means connected to said first electrode of said second device, a plurality of conductors connected to said second plurality of other electrodes of said second device, a plurality of digit registers selectively connecting said conductors to selected ones of said second plurality of other electrodes in said first device in accordance with the digit registered in each of said digit registers, and means coupling one of said second plurality of other electrodes in said first device to said first plurality of other electrodes of said second device whereby pulses are transmitted from said first device and applied to said second device.

11. In a signaling system comprising a plurality of variably settable registers and recording means for successively recording the setting of each register, first and second multielectrode gaseous discharge tubes each having a start anode, a start cathode, a main anode, a plurality of cathodes of a first order and a like plurality of cathodes of a second order alternately positioned opposite said main anode, means for momentarily applying a voltage pulse to the start anode of each of said tubes to effect discharge between the start anode and start cathode of each tube, said discharge immediately transferring so as to exist between the main anode and the start cathode of each of said tubes, a pulse generator connected to apply voltage pulses at a desired rate to all of the first order cathodes of said second tube, the first pulse being effective to transfer the discharge between the main anode and start cathode to an adjacent first order cathode and at the end of the pulse to transfer the discharge to the adjacent second order cathode, and each succeeding pulse being effective to transfer the discharge between the main anode and the energized second order cathode to the next adjacent first order cathode and at the end of the pulse from the first order cathode to the next adjacent second order cathode, means responsive to the energization of a last second order cathode of said second tube for applying a voltage pulse to the start anode to effect a recycling of said second tube, means including the first energized second order cathode of said second tube for applying once per cycle of operation of said second tube a voltage pulse to all of the first order cathodes of said first tube, the first of said pulses from said first energized second order cathode of said second tube being effective to transfer the discharge between the main anode and start cathode of said first tube to the adjacent first order cathode and at the end of the pulse from the first order cathode to the next adjacent second order cathode, each succeeding pulse from said first energized second order cathode of said second tube being effective to transfer the discharge in said first tube from the energized second order cathode to the next adjacent first order cathode and at the end of the pulse to the next adjacent second order cathode, conductors individually connecting each of the second order cathodes of said second tube intermediate the first and last second order cathodes to each of said registers, contacts in each of said registers selectively actuated to connect any particular code combination of said conductors to a different one of the second order cathodes of said first tube, and means energized in series with the main anode of said first tube when each second order cathode is successively energized for transmitting to said recording means signal pulses corresponding to the combination of conductors connected by the contacts of each register to said intermediate second order cathodes of said second tube.

12. In a signaling system comprising a plurality of groups of variably settable registers and recording means for successively recording the setting of each register, first and second multi-electrode gaseous discharge tubes each having a start cathode, a main anode, a plurality of cathodes of a first order and a like plurality of cathodes of a second order alternately positioned opposite said main anode, means for momentarily applying a voltage pulse to the start cathode of each of said tubes to effect discharge between the start cathode and the main anode of each tube, a pulse generator connected to apply voltage pulses at a desired rate to all of the first order cathodes of said second tube, the first pulse being effective to transfer the discharge between the main anode and the start cathode to an adjacent first order cathode and at the end of the pulse to transfer the discharge to the adjacent second order cathode, and each succeeding pulse being effective to transfer the discharge between the main anode and the energized second order cathode to the next adjacent first order cathode and at the end of the pulse from the first order cathode to the next adjacent second order cathode, means responsive to the energization of a last second order cathode of said second tube for applying a voltage pulse to the start cathode to effect a recycling of said second tube, means including the first energized second order cathode of said second tube for applying once per cycle of operation of said second tube a voltage pulse to all of the first order cathodes of said first tube, the first of said pulses from said first energized second order cathode of said second tube being effective to transfer the discharge between the main anode and start cathode of said first tube to the adjacent first order cathode and at the end of the pulse from the first order cathode to the next adjacent second order cathode, each succeeding pulse from said first energized second order cathode of said second tube being effective to transfer the discharge in said first tube from the energized second order cathode to the next adjacent first order cathode and at the end of the pulse to the next adjacent second order cathode, conductors individually connecting each of the second order cathodes of said second tube intermediate the first and last second order cathodes to each of said groups of registers, contacts in each of said groups of registers selectively actuated to connect any particular code combination of said conductors to a different one of the second order cathodes of said first tube, and means energized in series with the main anode of said first tube when each second order cathode is successively energized for transmitting to said recording means signal pulses corresponding to the combination of conductors connected by the contacts of each of said groups of registers to said intermediate second order cathode of said second tube.

EDWARD VROOM.

REFERENCES CITED

The following references are of record in the file of this patent:

UNITED STATES PATENTS

| Number | Name | Date |
|---|---|---|
| 2,116,372 | Weld | May 3, 1938 |
| 2,427,533 | Overbeck | Sept. 16, 1947 |
| 2,534,369 | Ress | Dec. 19, 1950 |